(12) United States Patent
Lee et al.

(10) Patent No.: US 9,341,530 B2
(45) Date of Patent: May 17, 2016

(54) BIOCOMPATIBLE PRESSURE SENSOR AND MANUFACTURING METHOD THEREOF

(71) Applicant: Korea Institute of Science and Technology, Seoul (KR)

(72) Inventors: Soo-Hyun Lee, Seoul (KR); Ji-Yoon Kang, Seoul (KR); Chang-Kun Park, Suwon (KR); Byung-Joo Kang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 605 days.

(21) Appl. No.: 13/644,017

(22) Filed: Oct. 3, 2012

(65) Prior Publication Data

US 2013/0098170 A1 Apr. 25, 2013

(30) Foreign Application Priority Data

Oct. 24, 2011 (KR) .......................... 10-2011-0108802

(51) Int. Cl.
  *G01L 7/00* (2006.01)
  *G01L 9/00* (2006.01)
  *G01L 7/08* (2006.01)
(52) U.S. Cl.
  CPC ...................................... *G01L 9/007* (2013.01)
(58) Field of Classification Search
  None
  See application file for complete search history.

(56) References Cited

U.S. PATENT DOCUMENTS

| | | | |
|---|---|---|---|
| 4,660,568 A * | 4/1987 | Cosman | 600/561 |
| 6,939,299 B1 * | 9/2005 | Petersen et al. | 600/398 |
| 7,901,970 B2 * | 3/2011 | Zribi et al. | 438/52 |
| 8,025,625 B2 * | 9/2011 | Allen | 600/561 |
| 2006/0174712 A1 * | 8/2006 | O'Brien et al. | 73/756 |
| 2009/0299216 A1 | 12/2009 | Chen et al. | |
| 2011/0152725 A1 * | 6/2011 | Demir et al. | 600/587 |

FOREIGN PATENT DOCUMENTS

KR    2002-0048892    6/2002

OTHER PUBLICATIONS

Korean Office Action mailed Feb. 20, 2013 for corresponding Korean Application No. 10-2011-0108802.

* cited by examiner

*Primary Examiner* — Peter Macchiarolo
*Assistant Examiner* — Jermaine Jenkins
(74) *Attorney, Agent, or Firm* — Goldilocks ZONE IP LAW

(57) ABSTRACT

Provided are a biocompatible pressure sensor which can be implanted into a body to wirelessly measure an internal pressure of the body outside the body, and a method of manufacturing the biocompatible pressure sensor. The biocompatible pressure sensor includes a coil inductor, a capacitor electrically connected with the coil inductor to constitute an LC resonant circuit together with the coil inductor, a flexible membrane disposed while being spaced apart from the coil inductor with an internal space interposed therebetween and surrounded by a housing, and a pressure displacement member fixed to one surface of the flexible membrane facing the coil inductor. The flexible membrane is transformed by external pressure to change a distance between the coil inductor and the pressure displacement member.

8 Claims, 20 Drawing Sheets

BIOCOMPATIBLE PRESSURE SENSOR AND MANUFACTURING METHOD THEREOF

CROSS-REFERENCE TO RELATED APPLICATION

This application claims priority to and the benefit of Korean Patent Application No. 10-2011-0108802 filed in the Korean Intellectual Property Office on Oct. 24, 2011, the entire contents of which are incorporated herein by reference.

BACKGROUND OF THE INVENTION (a) Field of the Invention

The present invention relates to a biocompatible pressure sensor, and more particularly, to a biocompatible pressure sensor which can be implanted into a body to wirelessly measure an internal pressure of the body outside the body, and a method of manufacturing the biocompatible pressure sensor.

(b) Description of the Related Art

A biocompatible pressure sensor is implanted into a body and used for measuring an internal pressure of the body. For example, a catheter tip pressure sensor for measuring a pressure of cerebrospinal fluid and a bladder pressure sensor for measuring a pressure of a bladder have been developed, and researches on an ocular pressure sensor for measuring intraocular pressure of a glaucoma patient have also been actively conducted.

A biocompatible pressure sensor may be manufactured by using a process of a micro electro-mechanical system (MEMS). A representative biocompatible pressure sensor includes a piezo-resistive pressure sensor using a piezo-resistive effect and a capacitive pressure sensor for measuring a pressure change based on a change in capacitance.

The piezo-resistive pressure sensor does not require external power, so that the piezo-resistive pressure sensor can be self-powered and has a high frequency response characteristic and excellent linearity. However, the piezo-resistive pressure sensor cannot measure a static pressure, has relatively low sensitivity, and is very sensitive to a temperature change, so a temperature compensation circuit needs to be included.

The capacitive pressure sensor has merits in that a response speed is rapid, the output thereof is less sensitive to change of a pressure and humidity, and both a static pressure and a dynamic pressure can be measured. However, an operation range of the capacitive pressure sensor is a narrow band, a manufacturing process is complex, and influence of a resistance component of a semiconductor and a high frequency parasitic component becomes large when the capacitive pressure sensor is used in a high frequency band, so it is difficult to use the capacitive pressure sensor.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an inductor-type biocompatible pressure sensor having excellent biocompatibility and precisely operability within a very small pressure range demanded within a body, and a method of manufacturing the inductor-type biocompatible pressure sensor. An exemplary embodiment of the present invention provides a biocompatible pressure sensor including: a coil inductor; a capacitor electrically connected with the coil inductor to constitute an LC resonant circuit together with the coil inductor; a flexible membrane disposed while being spaced apart from the coil inductor with an internal space interposed therebetween and surrounded by a housing; and a pressure displacement member fixed to one surface of the flexible membrane facing the coil inductor, in which the flexible membrane is transformed by external pressure to change a distance between the coil inductor and the pressure displacement member.

The housing may include a structure in which a first substrate and a second substrate forming the internal space having opened upper and lower parts are stacked. The first substrate and the second substrate may include silicon, and silicon nitride layers may be positioned on surfaces of the first substrate and the second substrate.

An insulating layer may be positioned on the first substrate so as to cover the upper part of the internal space, and the coil inductor and the capacitor may be positioned on an exterior surface of the insulating layer. The coil inductor may be positioned at a center of the insulating layer, and the capacitor may be positioned outside the coil inductor.

The coil inductor may include an inner pad part, an outer pad part, and a conducting wire which has a predetermined width, connects the inner pad part and the outer pad part, and is disposed in a shape of vortex. The capacitor may include an upper electrode and a lower electrode stacked with a dielectric material interposed therebetween, and the upper electrode and the lower electrode may be electrically connected to the inner pad part and the outer pad part, respectively. The coil inductor and the capacitor may be covered by a passivation layer.

The flexible membrane may be fixed to a lower surface of the second substrate so as to cover the lower part of the internal space and may be formed of an elastic material layer formed of a bio-polymer. The pressure displacement member may include ferrite. Otherwise, the pressure displacement member may include a metal.

Another exemplary embodiment of the present invention provides a method of manufacturing a biocompatible pressure sensor, the method including: forming an insulating layer on a first substrate; forming a coil inductor and a capacitor constituting an LC resonant circuit on the insulating layer; forming an internal space by removing a part of the first substrate; attaching a flexible membrane on the second substrate; forming an internal space by removing a part of the second substrate; fixing a pressure displacement member to one surface of the flexible membrane; and assembling and bonding the first substrate and the second substrate so that the insulating layer faces the pressure displacement member with the internal space interposed therebetween.

The method of manufacturing the biocompatible pressure sensor may further include covering the coil inductor and the capacitor with a passivation layer after the forming of the coil inductor and the capacitor. The insulating layer may include polyimide, and the passivation layer may include polyurethane.

The flexible membrane may be formed of an elastic material layer formed of a bio-polymer. The pressure displacement member may include one of a magnetic material including ferrite and a metal material including copper or aluminum.

The biocompatible pressure sensor is easily operated within a very small pressure range demanded within a body, so that it is possible to precisely measure a fine pressure change within the body. Further, the biocompatible pressure sensor can simply measure the change of the internal pressure of the body by using a wireless measurement apparatus outside the body.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention FIG. 1 is an exploded perspective view illustrating a biocompatible pressure sensor 100 according to an exemplary embodiment of the present invention, and FIG. 2 is a cross-sectional view illustrating a coupled state of the biocompatible pressure sensor 100 illustrated in FIG. 1.

Figure 1:
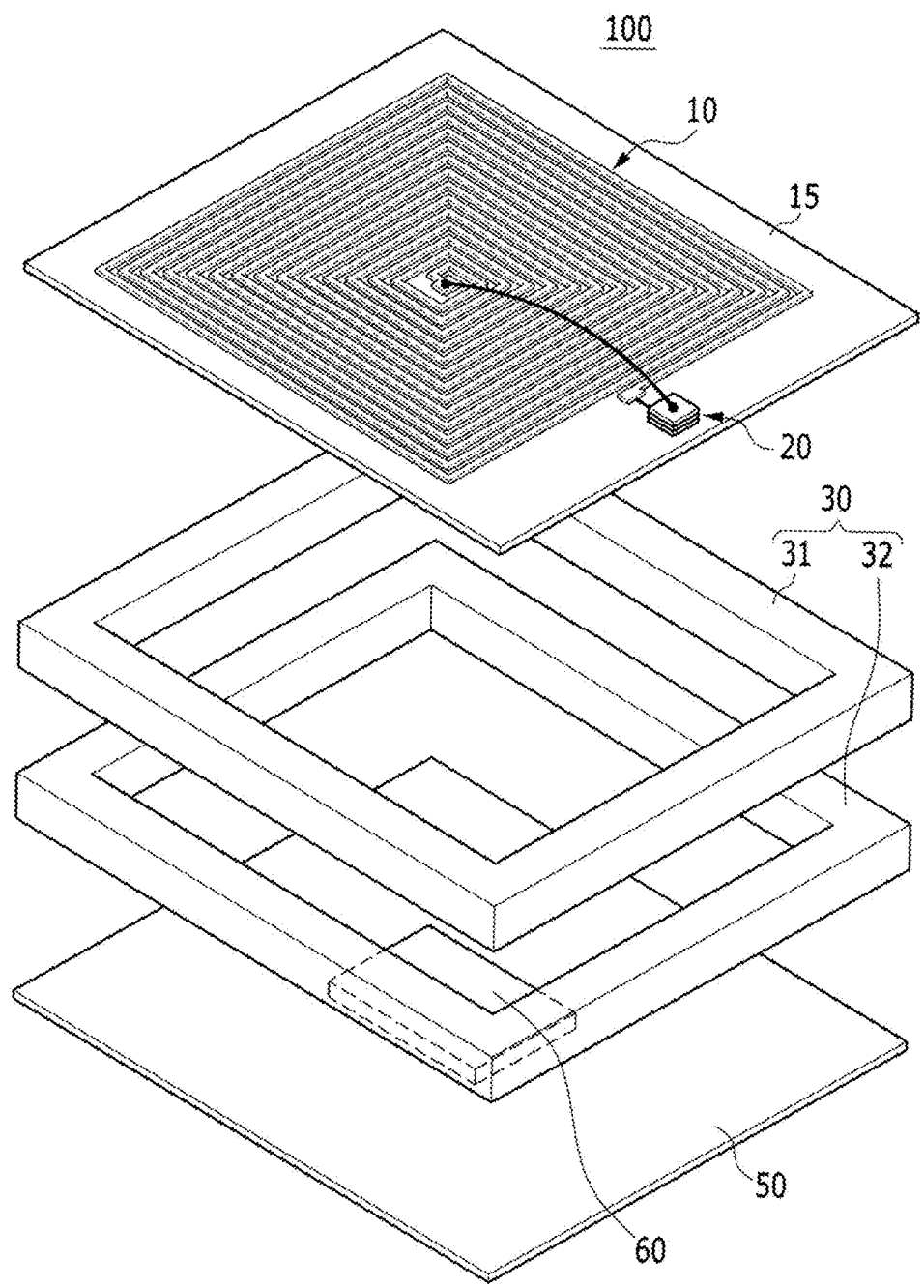
FIG. 1 is an exploded perspective view illustrating a biocompatible pressure sensor according to an exemplary embodiment of the present invention.
Figure 2:
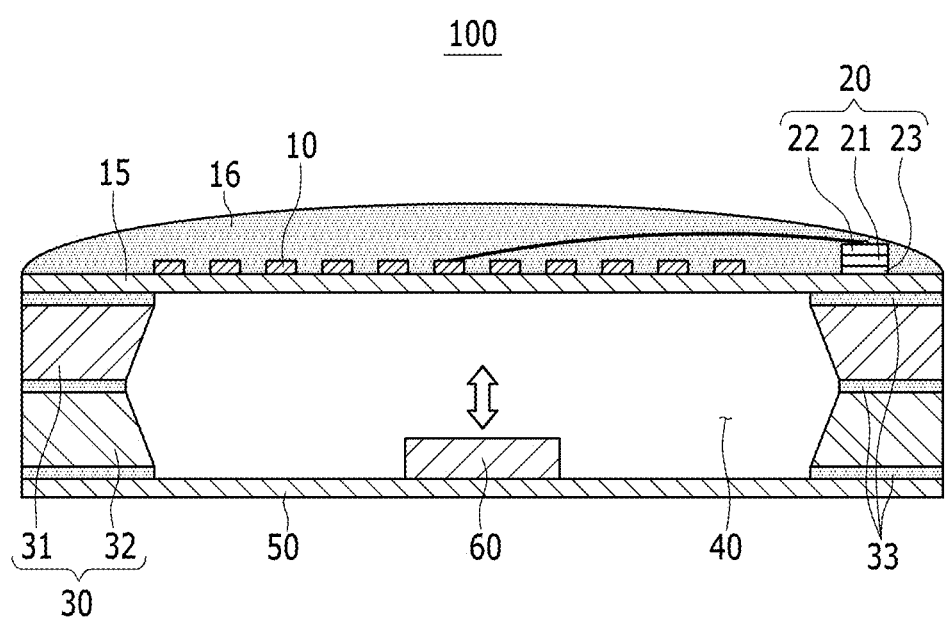
FIG. 2 is a cross-sectional view illustrating a coupled state of the biocompatible pressure sensor illustrated in FIG. 1.

Referring to FIGS. 1 and 2, the biocompatible pressure sensor 100 according to the present exemplary embodiment includes a coil inductor 10 and a capacitor 20 constituting an LC resonant circuit.

Further, the biocompatible pressure sensor 100 includes a flexible membrane 50 disposed while being spaced apart from the coil inductor 10 with an interposed internal space 40 surrounded by a housing 30, and a pressure displacement member 60 fixed to one surface of the flexible membrane 50 facing the coil inductor 10.

The flexible membrane 50 is transformed toward inside the internal space 40 according to an increase in an internal pressure of a body, and a distance between the pressure displacement member 60 and the coil inductor 10 is changed according to the transformation of the flexible membrane 50. Further, according to the distance change, an inductance of the coil inductor 10 is changed.

The biocompatible pressure sensor 100 of the present exemplary embodiment may precisely detect an internal pressure of the body by measuring a change of a resonant frequency according to an inductance change.

A detailed structure of the biocompatible pressure sensor 100 is as follows.

The housing 30 has a structure in which a first substrate 31 and a second substrate 32 having a frame shape are stacked, and the internal space 40 having opened upper and lower parts is formed in inner sides of the first substrate 31 and the second substrate 32. For the convenience of description, based on FIGS. 1 and 2, the substrate positioned in the upper side is referred to as the first substrate 31, and the substrate positioned in the lower side is referred to as the second substrate 32.

The first substrate 31 and the second substrate 32 may be formed of silicon. Silicon nitride layers 33 may be positioned on upper and lower surfaces of the first substrate 31 and upper and lower surfaces of the second substrate 32. The silicon nitride layers 33 positioned while facing the coil inductor 10 and the flexible membrane 50 function as insulating layers, and the silicon nitride layers 33 positioned in opposite surfaces may be used as etching masks when the first substrate 31 and the second substrate 32 are wet etched. A material of the first substrate 31 and the second substrate 32 is not limited to the aforementioned example, and the first substrate 31 and the second substrate 32 may be formed of another material.

An insulating layer 15 is positioned so as to cover an upper part of the internal space 40 above the first substrate 31. The insulating layer 15 may be formed of polyimide. The coil inductor 10 is positioned at a center of the insulating layer 15 on the insulating layer 15, and the capacitor 20 is positioned outside the coil conductor 10 on the insulating layer 15.

Figure 3:
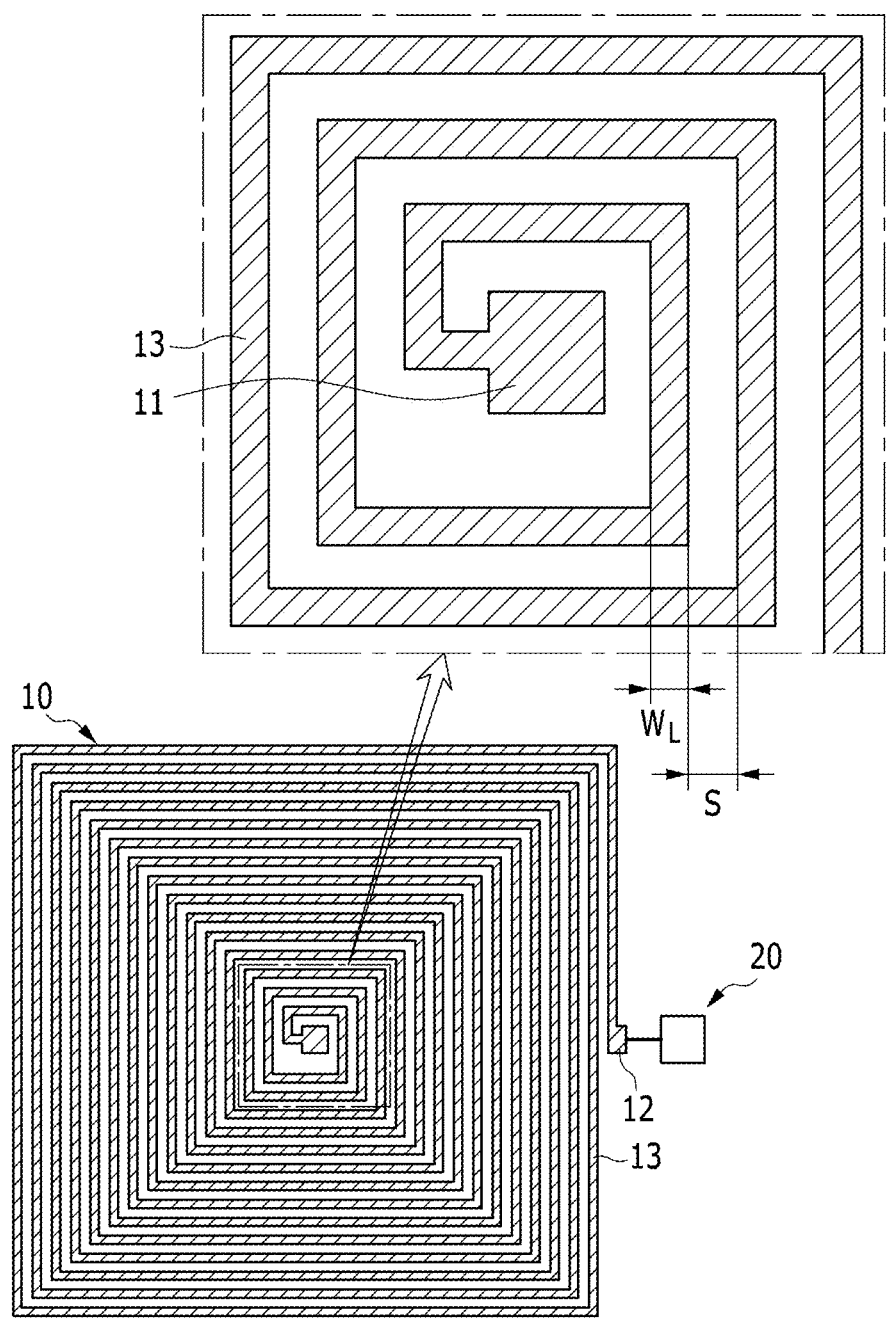
FIG. 3 is a schematic diagram illustrating a coil inductor and a capacitor in the biocompatible pressure sensor illustrated in FIG. 1.

FIG. 3 is a schematic diagram illustrating the coil inductor and the capacitor in the biocompatible pressure sensor illustrated in FIG. 1.

Referring to FIG. 3, the coil inductor 10 includes an inner pad part 11 and an outer pad part 12, and has a shape in which a conducting wire 13 having a predetermined width and a predetermined thickness is disposed in a quadrangular vortex shape from the inner pad part 11 toward the outer pad part 12 while having a predetermined interval. The coil inductor 10 may be formed of a copper layer.

Otherwise, the coil inductor 10 may have a stacked structure in which a height of the conducting wire gradually increases from the outside to the inside of the coil inductor 10. FIG. 3 illustrates an example in which the coil inductor 10 is formed of the conducting wire 13 having a predetermined width and a predetermined thickness on the insulating layer 15 without a height change. In FIG. 3, $W_L$ represents a width of the conducting wire 13 and S represents an interval in the conducting wire 13.

The capacitor 20 is a single layer capacitor, and includes an upper electrode 22 (see FIG. 2) and a lower electrode 23 (see FIG. 2) with a dielectric material 21 interposed therebetween (see FIG. 2).

The lower electrode 23 is electrically connected to the outer pad part 12 of the coil inductor 10, and the upper electrode 22 is electrically connected to the inner pad part 11 of the coil inductor 10 through wire bonding. The capacitor 20 forms the LC resonant circuit together with the coil inductor 10.

Referring to FIGS. 1 and 2 again, the coil inductor 10 and the capacitor 20 are covered by a passivation layer 16. The passivation layer 16 may be a polymer resin layer, such as polyurethane.

The flexible membrane 50 is positioned so as to cover the lower part of the internal space 40 under the second substrate 32. The flexible membrane 50 is an elastic material layer transformed by an external pressure, and is manufactured of a bio-polymer having excellent biocompatibility. For example, the flexible membrane 50 may be formed of MED 6640 that is a trademark name of Nusil Company.

The flexible membrane 50 is fixed to the second substrate 32, and a part of the flexible membrane 50 facing the internal space 40 is transformed toward the internal space 40 according to an increase in the internal pressure of the body into which the biocompatible pressure sensor 100 is implanted. The flexible membrane 50 is easily transformed within a very small pressure range demanded within the body.

The pressure displacement member 60 is fixed to one surface of the flexible membrane 50 facing the coil inductor 10, that is, the inner surface of the flexible membrane 50. The pressure displacement member 60 may be formed of a magnetic material including ferrite or may be formed of metal, such as copper or aluminum. The pressure displacement member 60 moves up according to the transformation of the flexible membrane 50, so that a distance between the pressure displacement member 60 and the coil inductor 10 is changed.

Figure 4A:
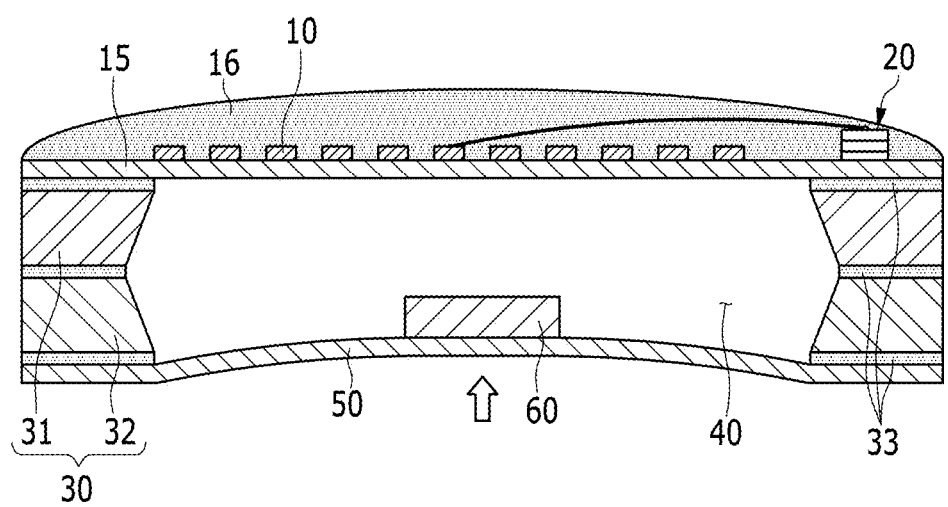
FIGS. 4A and 4B are cross-sectional views illustrating an operational state of the biocompatible pressure sensor illustrated in FIG. 1.
Figure 4B:
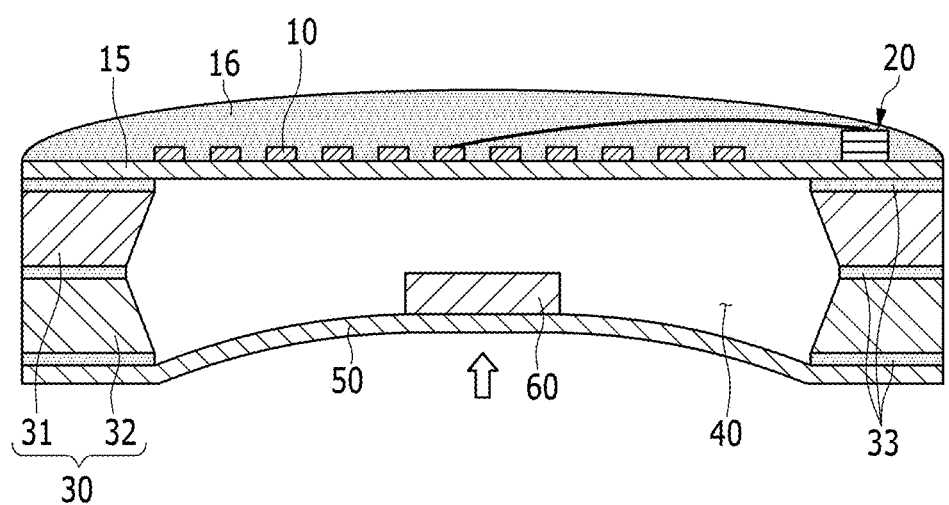

FIGS. 4A and 4B are cross-sectional views illustrating an operational state of the biocompatible pressure sensor illustrated in FIG. 1.

Referring to FIGS. 4A and 4B, the part of the flexible membrane 50 facing the internal space 40 is convexly transformed toward the internal space 40 according to an increase in external pressure, and as the external pressure increases, an amount of transformation of the flexible membrane 50 increases. Further, the pressure displacement member 60 moves up according to the transformation of the flexible membrane 50, so that the distance between the pressure displacement member 60 and the coil inductor 10 is changed. In this case, a size of the external pressure is proportional to the amount by which the pressure displacement member 60 moves up.

The pressure displacement member 60 formed of ferrite causes the inductance to increase according to the decrease in the distance between the pressure displacement member 60 and the coil inductor 10. In the meantime, an eddy current is generated according to the decrease in the distance between the pressure displacement member 60 formed of metal and the coil inductor 10, so that the pressure displacement member 60 causes the inductance to decrease. However, since the principles of the inductance change according to the change of the external pressure are the same in the two cases, the internal pressure of the body may be detected by using the principles.

Figure 5:
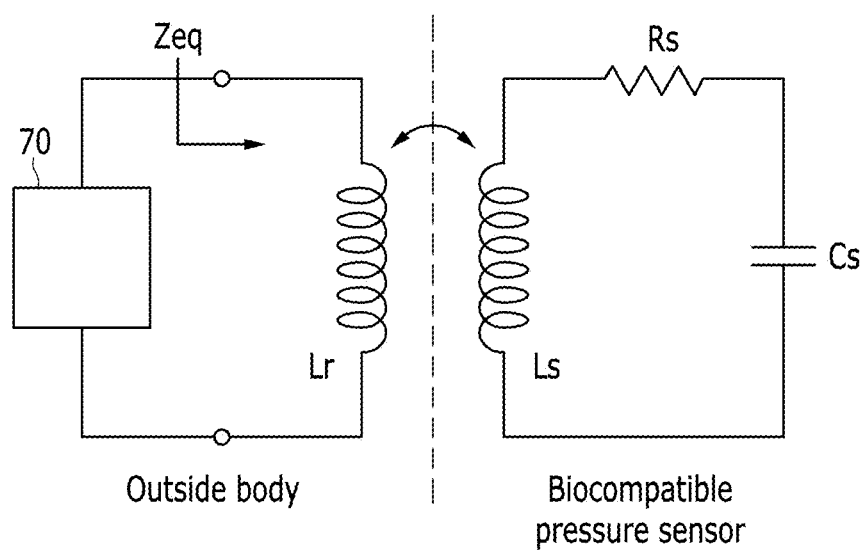
FIG. 5 is a circuit diagram illustrating a biocompatible pressure sensor implanted into a body and an external measurement apparatus positioned outside a body.

FIG. 5 is a circuit diagram illustrating the biocompatible pressure sensor implanted into the body and an external measurement apparatus positioned outside the body.

Referring to FIG. 5, when the coil inductor of the biocompatible pressure sensor is referred to as a first inductor Ls, an external measurement apparatus 70 includes a second inductor Lr. The inductance change of the first inductor Ls is transferred to the second inductor Lr by a mutual inductance action. Accordingly, the external measurement apparatus 70 may detect a pressure applied to the biocompatible pressure sensor based on a resonant frequency change according to the inductance change of the second inductor Lr.

The flexible membrane 50 among the aforementioned configurations is easily operated within a very small pressure range demanded within the body, and precisely adjusts a height of the pressure displacement member 60 in proportion to the increase in the external pressure. Accordingly, when the biocompatible pressure sensor 100 according to the present exemplary embodiment is used, a fine pressure change within the body may be precisely measured by using the external measurement apparatus 70 outside the body.

Figure 6A:
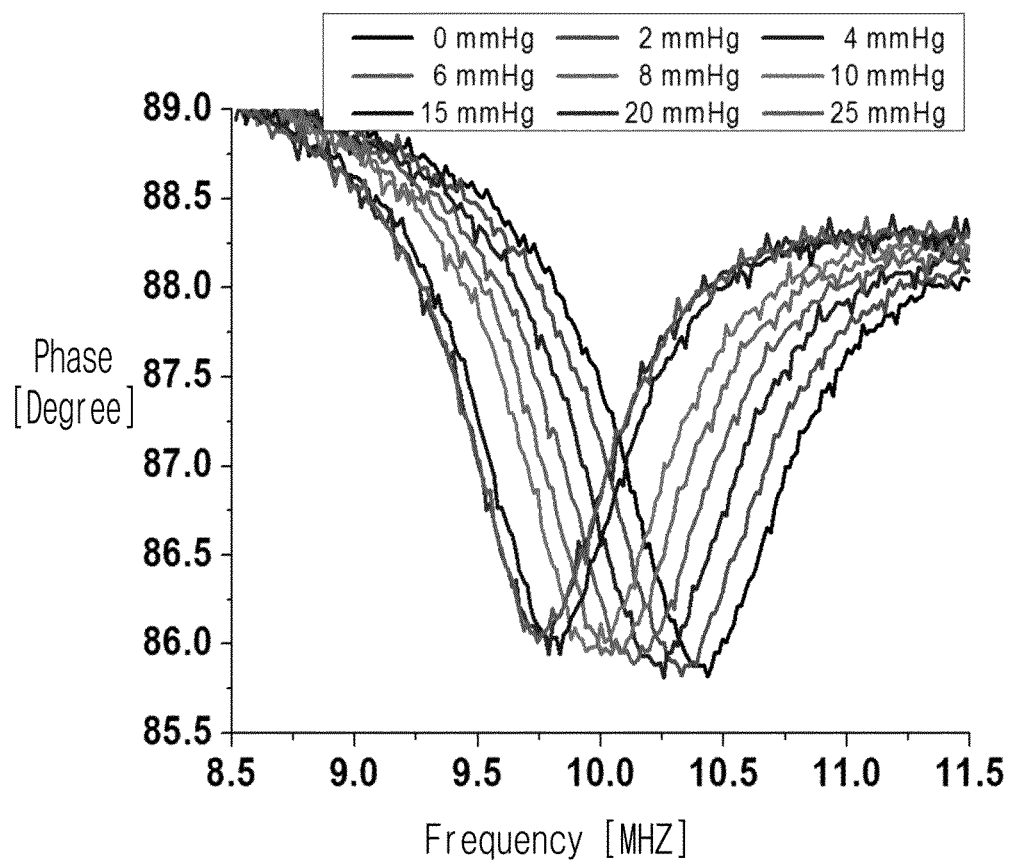
FIG. 6A is a graph illustrating a frequency-phase change according to a distance between a coil inductor and a pressure displacement member in Example 1 in which the pressure displacement member is formed of ferrite.
Figure 6B:
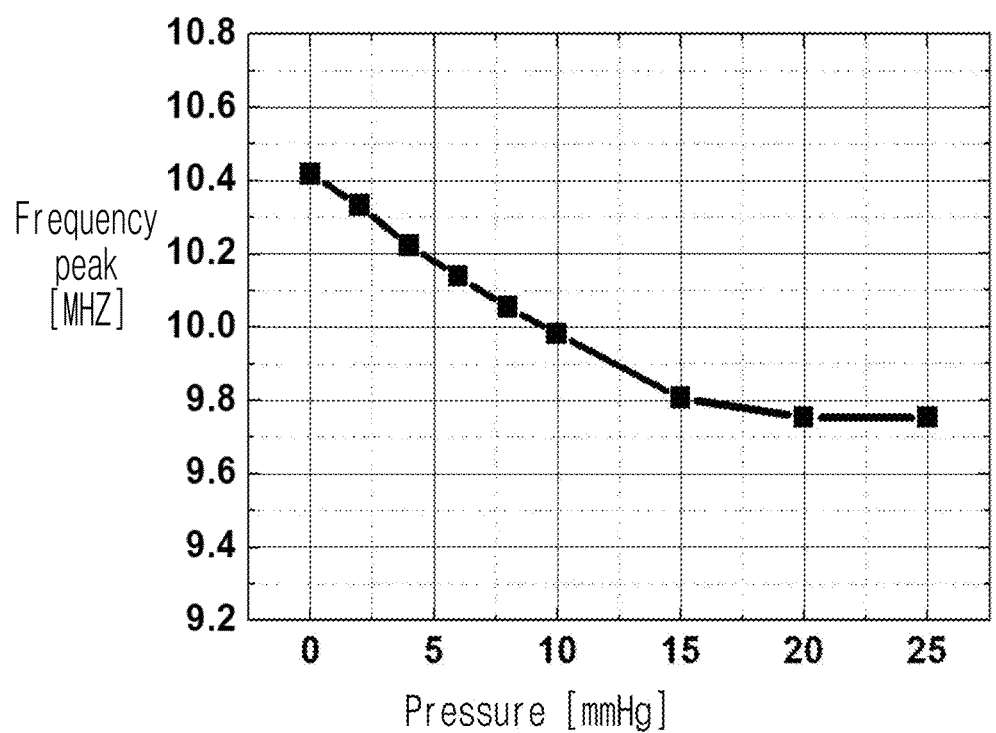
FIG. 6B is a graph illustrating a frequency-peak change according to a pressure in Example 1 in which the pressure displacement member is formed of ferrite.

FIG. 6A is a graph illustrating a frequency-phase change according to a distance between the coil inductor and the pressure displacement member in Example 1 in which the pressure displacement member is formed of ferrite, and FIG. 6B is a graph illustrating a frequency-peak change according to a pressure in Example 1.

Figure 7A:
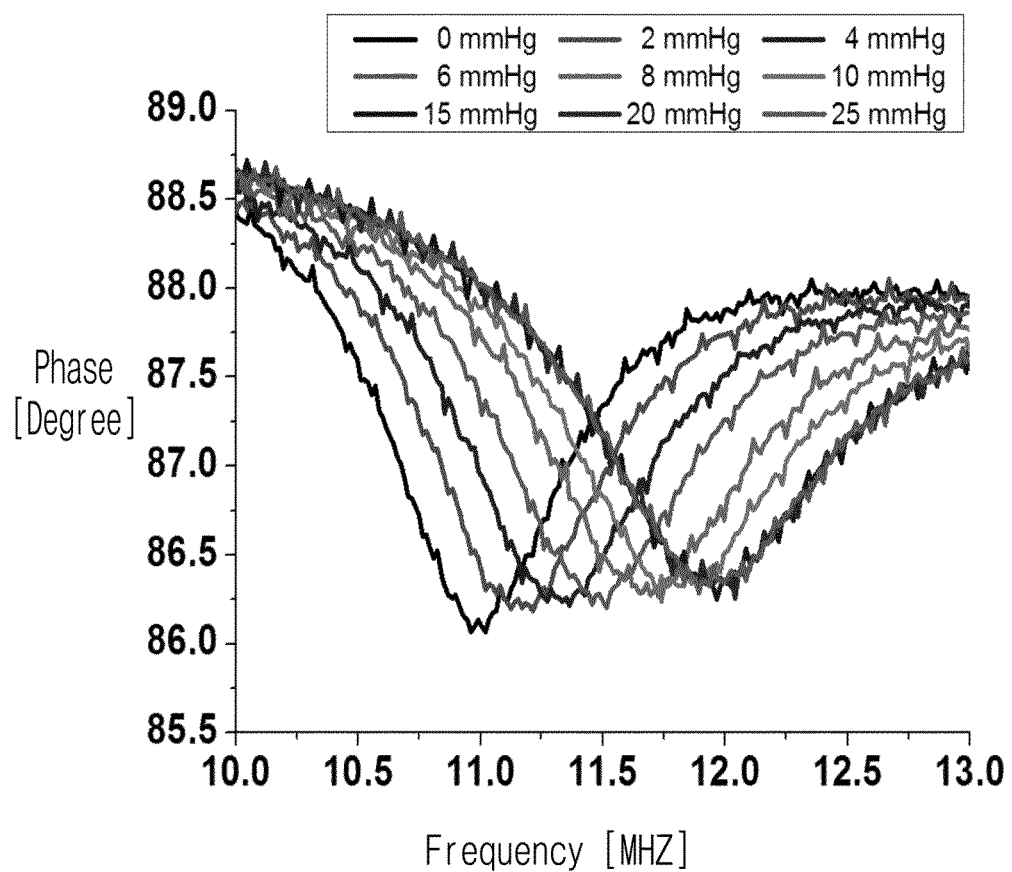
FIG. 7A is a graph illustrating a frequency-phase change according to a distance between a coil inductor and a pressure displacement member in Example 2 in which the pressure displacement member is formed of copper.
Figure 7B:
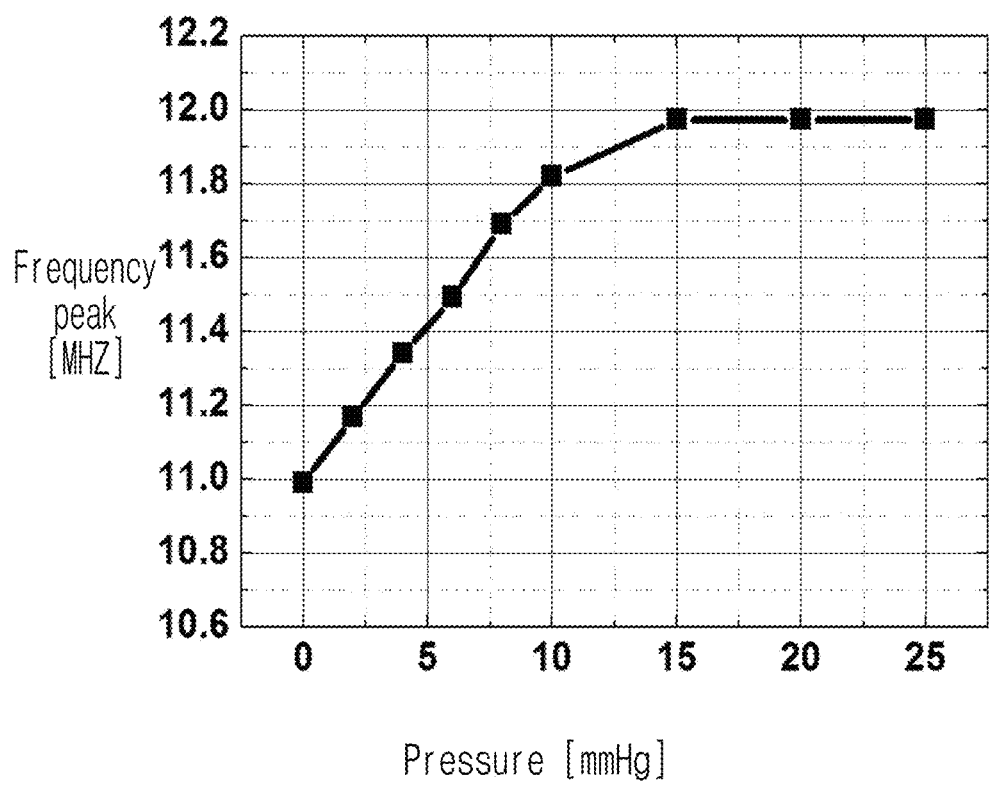
FIG. 7B is a graph illustrating a frequency-peak change according to a pressure in Example 2 in which the pressure displacement member is formed of copper.

FIG. 7A is a graph illustrating a frequency-phase change according to a distance between the coil inductor and the pressure displacement member in Example 2 in which the pressure displacement member is formed of copper, and FIG. 7B is a graph illustrating a frequency-peak change according to a pressure in Example 2.

Figure 8A:
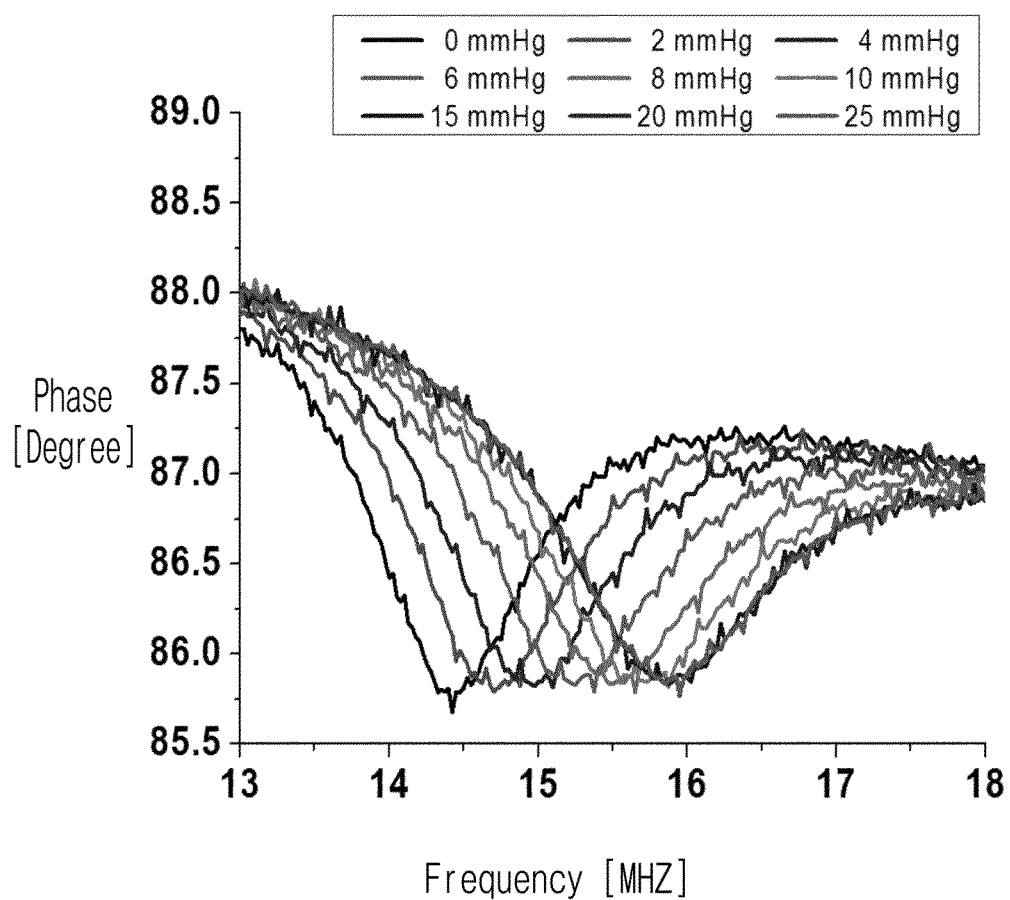
FIG. 8A is a graph illustrating a frequency-phase change according to a distance between a coil inductor and a pressure displacement member in Example 3 in which the pressure displacement member is formed of aluminum.
Figure 8B:
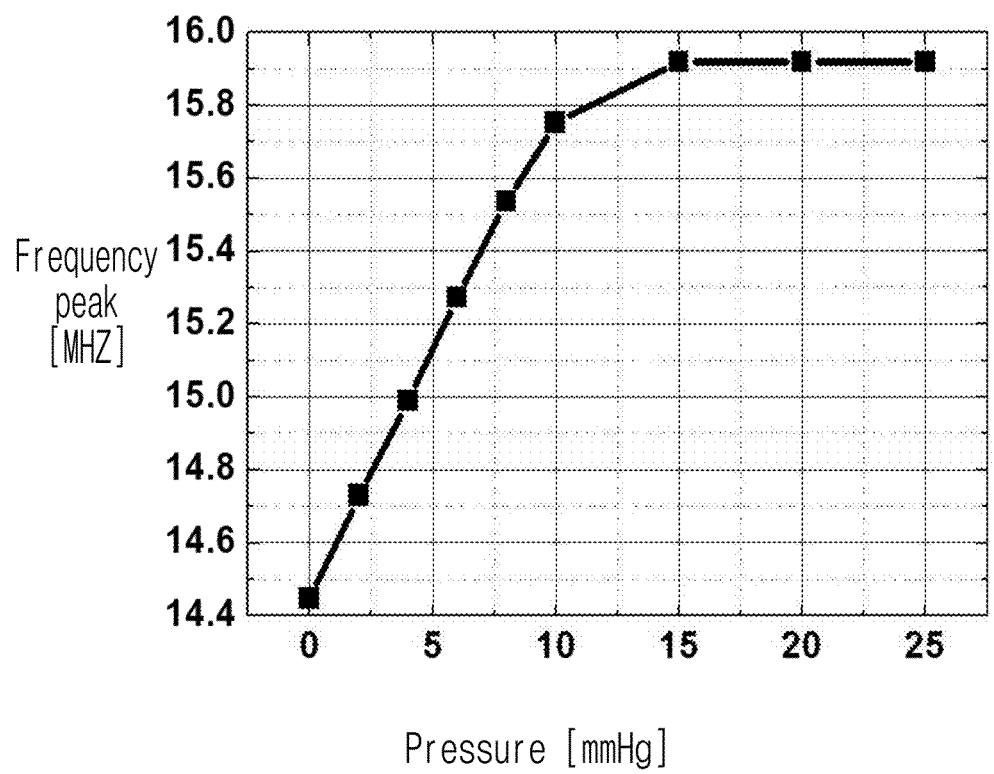
FIG. 8B is a graph illustrating a frequency-peak change according to a pressure in Example 3 in which the pressure displacement member is formed of aluminum.

FIG. 8A is a graph illustrating a frequency-phase change according to a distance between the coil inductor and the pressure displacement member in Example 3 in which the pressure displacement member is formed of aluminum, and FIG. 8B is a graph illustrating a frequency-peak change according to a pressure in Example 3.

In all of Examples 1 to 3, a distance between the external measurement apparatus and the biocompatible pressure sensor is 5 mm. The external measurement apparatus includes the second inductor having the number of times of winding (turns) of 10.5 and a diameter of 10 mm, and has a resonant frequency of 57 MHz.

In Example 1, the coil inductor includes the conducting wire having a width of 50 μm and an interval of 30 μm, and the number of times of winding (turns) of the conducting wire is 23. In Example 2, the coil inductor includes the conducting wire having a width of 50 μm and an interval of 30 μm, and the number of times of winding (turns) of the conducting wire is 31. In Example 3, the coil inductor includes the conducting wire having a width of 50 μm and an interval of 50 μm, and the number of times of winding (turns) of the conducting wire is 24.

In Example 1, a size of the pressure displacement member is 3 mm (horizontal)×3 mm (vertical), and in Examples 2 and 3, a size of the pressure displacement member is 2 mm (horizontal)×2 mm (vertical).

In Example 1, when the pressure is changed within a range of 0 to 50 mmHg, an amount of the frequency peak change is 0.66 MHz, and a saturation point is 9.75 MHz in 20 mmHg. In Example 2, when the pressure is changed within a range of 0 to 50 mmHg, an amount of the frequency peak change is 0.98 MHz, and a saturation point is 11.97 MHz in 15 mmHg. In Example 3, when the pressure is changed within a range of 0 to 50 mmHg, an amount of the frequency peak change is 1.47 MHz, and a saturation point is 15.91 MHz in 15 mmHg.

Referring to FIGS. 6A to 8B, in Example 1, it can be seen that a value of Q (quality factor) in the resonant frequency graph is high, but the amount of the change of the frequency-peak itself according to the pressure change is small. In contrast, in Examples 2 and 3, it can be seen that a value of Q in the resonant frequency graph is low, but the amount of the change of the frequency-peak itself according to the pressure change is larger.

Figure 9:
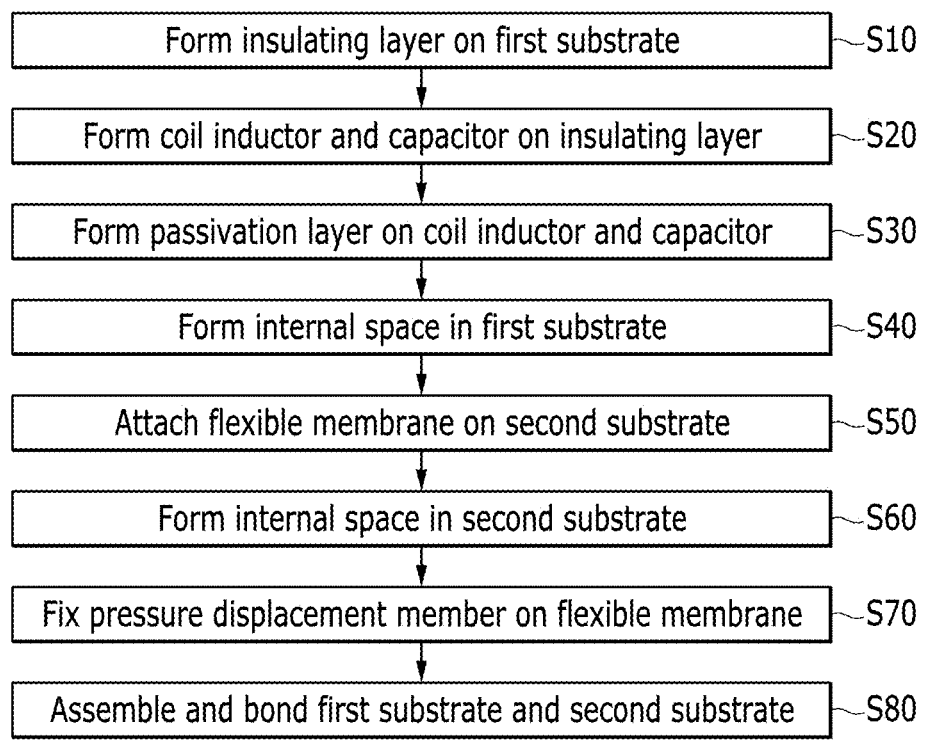
FIG. 9 is a process flowchart illustrating a method of manufacturing a biocompatible pressure sensor according to an exemplary embodiment of the present invention.

FIG. 9 is a process flowchart illustrating a method of manufacturing a biocompatible pressure sensor according to an exemplary embodiment of the present invention, and FIGS. 10A to 10G are schematic cross-sectional views sequentially illustrating a first step to an eighth step illustrated in FIG. 9.

Referring to FIG. 9, a method of manufacturing a biocompatible pressure sensor according to the present exemplary embodiment includes a first step S10 of forming an insulating layer on a first substrate, a second step S20 of forming a coil inductor and a capacitor on the insulating layer, a third step S30 of forming a passivation layer on the coil inductor and the capacitor, and a fourth step S40 of forming an internal space in the first substrate.

Further, the method of manufacturing the biocompatible pressure sensor according to the present exemplary embodiment includes a fifth step S50 of attaching a flexible membrane on a second substrate, a sixth step S60 of forming an internal space in the second substrate, a seventh step S70 of fixing a pressure displacement member to one surface of the flexible membrane, and an eighth step S80 of assembling and bonding the first substrate and the second substrate.

Figure 10A:
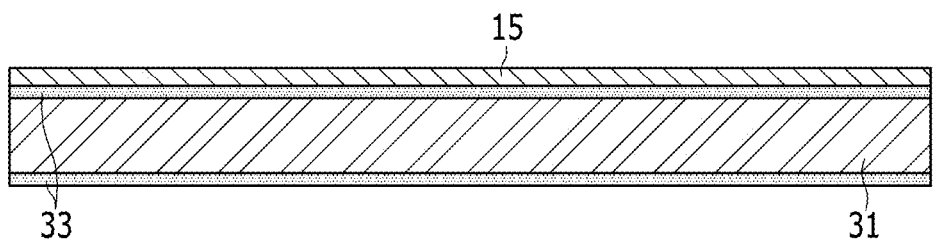
FIGS. 10A to 10G are schematic cross-sectional views sequentially illustrating a first step to an eighth step illustrated in FIG. 9.

Referring to FIG. 10A, in the first step S10, the first substrate 31 is prepared, and an insulating layer 15 is formed on one surface of the first substrate 31. The first substrate 31 may be formed of silicon and a silicon nitride layer 33 may be positioned on a surface of the first substrate 31. The insulating layer 15 may include polyimide and may be formed by a method, such as spin coating.

Figure 10B:
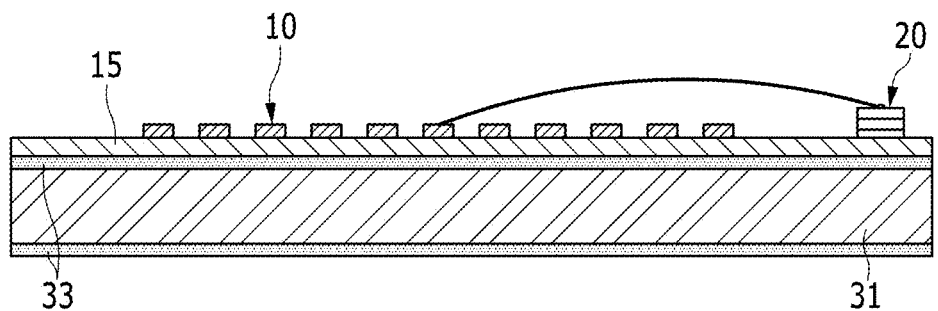

Referring to FIG. 10B, in the second step S20, a metal layer (for example, a copper layer) is formed on the insulating layer 15 by a method, such as deposition or sputtering, and the coil inductor 10 is formed by patterning the metal layer by a method, such as etching. Then, the capacitor 20 including a lower electrode, a dielectric material, and an upper electrode is formed outside the coil inductor 10, and an LC resonant circuit is formed by electrically connecting the coil inductor 10 and the capacitor 20.

Figure 10C:
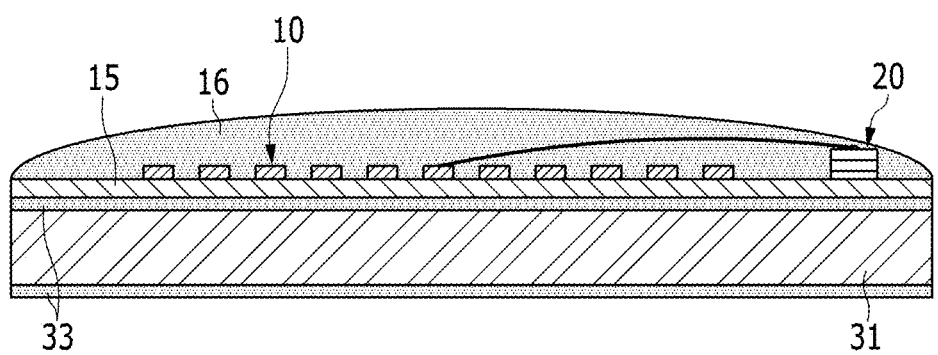

Referring to FIG. 10C, in the third step S30, the passivation layer 16 is formed on the coil inductor 10 and the capacitor 20 so as to prevent the coil inductor 10 and the capacitor 20 from being exposed to the outside. The passivation layer 16 may be a polymer resin layer, such as polyurethane.

Figure 10D:
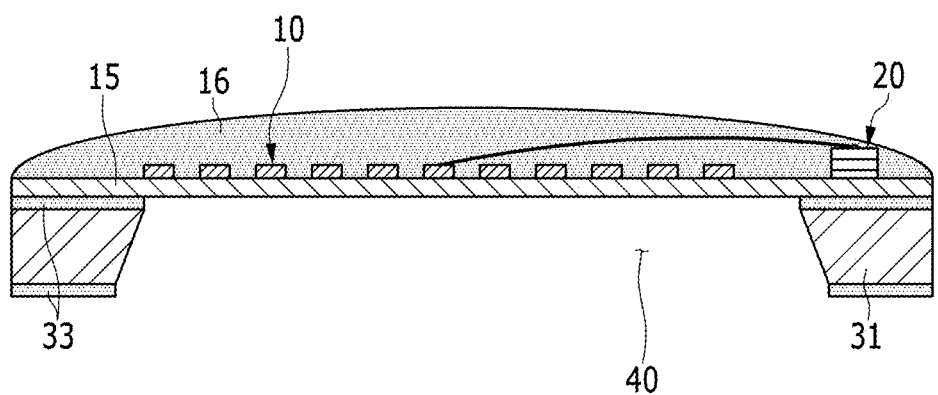

Referring to FIG. 10D, in the fourth step S40, the internal space 40 having an opened lower part is formed by removing a center part of the first substrate 31 by a method, such as etching. When wet etching is applied, the internal space may be formed by forming an etching mask by first patterning the silicon nitride layer 33 on a lower surface of the first substrate 31, and wet etching a non-covered part of the first substrate 31 with the etching mask. In this case, an inner wall of the first substrate 31 may be formed in an inclined surface.

Figure 10E:
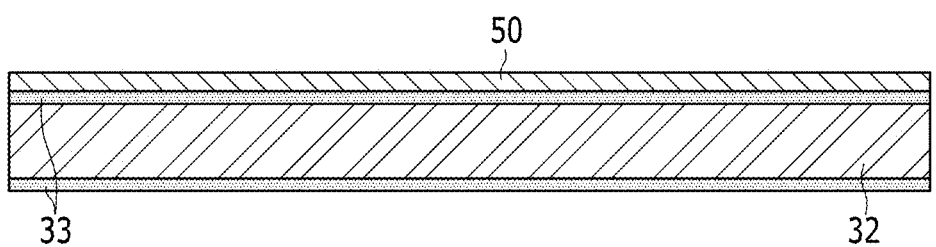

Referring to FIG. 10E, in the fifth step S50, the second substrate 32 is prepared and the flexible membrane 50 is attached to one surface of the second substrate 32. The second substrate 32 may be formed of silicon, and the silicon nitride layer 33 may be positioned on a surface of the second substrate 32. The flexible membrane 50 is an elastic material layer transformed by external pressure and is manufactured of a bio-polymer having excellent biocompatibility.

Figure 10F:
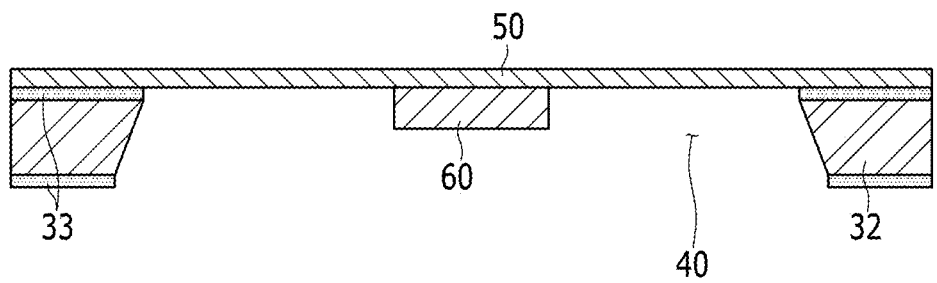

Referring to FIG. 10F, in the sixth step S60, the internal space 40 having the opened lower part is formed by removing a center part of the second substrate 32 by a method, such as etching. When wet etching is applied, the internal space 40 may be formed by forming an etching mask by first patterning the silicon nitride layer 33 on a lower surface of the second substrate 32, and wet etching a non-covered part of the second substrate 32 with the etching mask. In this case, an inner wall of the second substrate 32 may be formed in an inclined surface. As the internal space 40 is formed, the center part of the flexible membrane 50 is opened toward the internal space 40.

In the seventh step S70, the pressure displacement member 60 is fixed to the center of one surface of the flexible membrane 50 facing the internal space 40 by using an adhesive agent, or the like. The pressure displacement member 60 may be formed of ferrite or a metal, such as copper or aluminum.

Figure 10G:
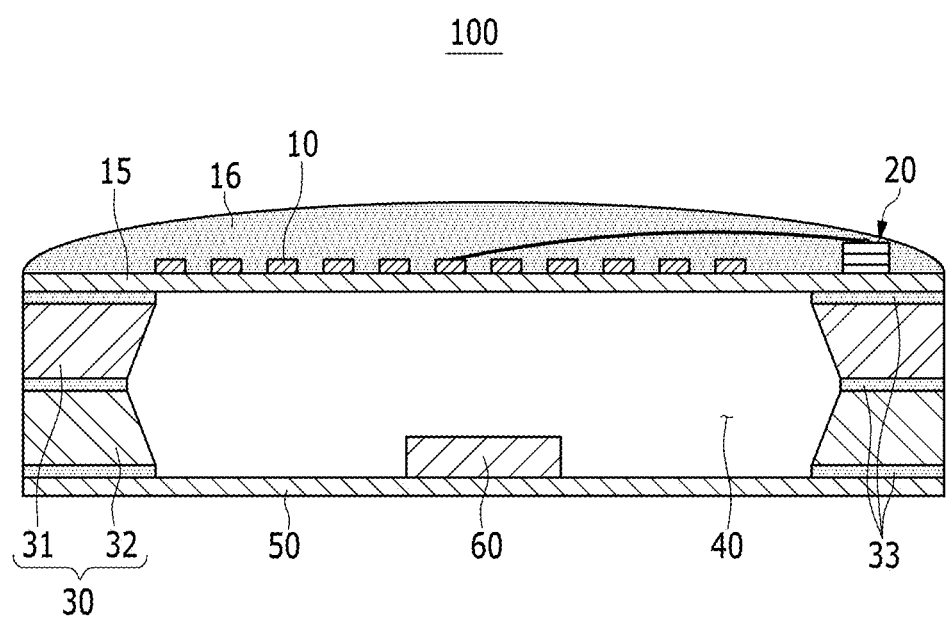

Referring to FIG. 10G, in the eighth step S80, the first substrate 31 and the second substrate 32 are assembled with and bonded to each other so that the insulating layer 15 directly faces the pressure displacement member 60. The internal space 40 between the insulating layer 15 and the pressure displacement member 60 is filled with air, and the flexible membrane 50 is transformed according to a change of external pressure, so that a height of the pressure displacement member 60 is changed.

The biocompatible pressure sensor 100 is completed through the aforementioned processes, and the completed biocompatible pressure sensor 100 may be used for detecting an intraocular pressure while being implanted into an eyeball.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 100: Biocompatible pressure sensor | 10: Coil inductor |
| 15: Insulating layer | 16: Passivation layer |
| 20: Capacitor | 30: Housing |
| 31: First substrate | 32: Second substrate |
| 33: Silicon nitride layer | 40: Internal space |
| 50: Flexible membrane | 60: Pressure displacement member |

What is claimed is:
1. A biocompatible pressure sensor, comprising:
  a coil inductor;
  a capacitor electrically connected with the coil inductor to constitute an LC resonant circuit together with the coil inductor;
  a flexible membrane disposed while being spaced apart from the coil inductor with an interposed internal space therebetween and surrounded by a housing; and
  a pressure displacement member fixed to one surface of the flexible membrane facing the coil inductor,
  wherein the flexible membrane is transformed by external pressure to change a distance between the coil inductor and the pressure displacement member,
  wherein the housing includes a structure in which a first substrate and a second substrate forming the internal space having opened upper and lower parts are stacked,
  wherein
  an insulating layer is positioned on the first substrate so as to cover the upper part of the internal space, and the coil inductor and the capacitor are positioned on an exterior surface of the insulating layer.

2. The biocompatible pressure sensor of claim 1, wherein:
the coil inductor is positioned at a center of the insulating layer, and
the capacitor is positioned outside the coil inductor.

3. The biocompatible pressure sensor of claim 1, wherein:
the coil inductor comprises an inner pad part, an outer pad part, and a conducting wire which has a predetermined width, connects the inner pad part and the outer pad part, and is disposed in a shape of vortex.

4. The biocompatible pressure sensor of claim 3, wherein:
the capacitor includes an upper electrode and a lower electrode stacked with a dielectric material interposed therebetween, and
the upper electrode and the lower electrode are electrically connected to the inner pad part and the outer pad part, respectively.

5. The biocompatible pressure sensor of claim 1, wherein:
the coil inductor and the capacitor are covered by a passivation layer.

6. The biocompatible pressure sensor of claim 1, wherein:
the flexible membrane is fixed to a lower surface of the second substrate so as to cover the lower part of the internal space and is formed of an elastic material layer formed of a bio-polymer.

7. The biocompatible pressure sensor of claim 1, wherein:
the pressure displacement member includes ferrite, and as the pressure displacement member becomes close to the coil inductor, an inductance of the coil inductor increases.

8. The biocompatible pressure sensor of claim 1, wherein:
the pressure displacement member includes a metal, and as the pressure displacement member becomes close to the coil inductor, an inductance of the coil inductor decreases.

* * * * *